(No Model.)

C. J. PHILLIPS.
DEVICE FOR CLOSING OPENINGS IN PIPES.

No. 345,073. Patented July 6, 1886.

WITNESSES:
C. Neveux
E. McClark

INVENTOR:
C. J. Phillips
BY Munn & Co
ATTORNEYS.

UNITED STATES PATENT OFFICE.

CORNELIUS J. PHILLIPS, OF NEW YORK, N. Y.

DEVICE FOR CLOSING OPENINGS IN PIPES.

SPECIFICATION forming part of Letters Patent No. 345,073, dated July 6, 1886.

Application filed April 17, 1886. Serial No. 199,188. (No model.)

*To all whom it may concern:*

Be it known that I, CORNELIUS J. PHILLIPS, of the city, county, and State of New York, have invented a new and Improved Device for Closing Openings in Pipes, of which the following is a full, clear, and exact description.

Reference is to be had to the accompanying drawings, forming a part of this specification, in which similar letters of reference indicate corresponding parts in all the figures.

Figure 1:
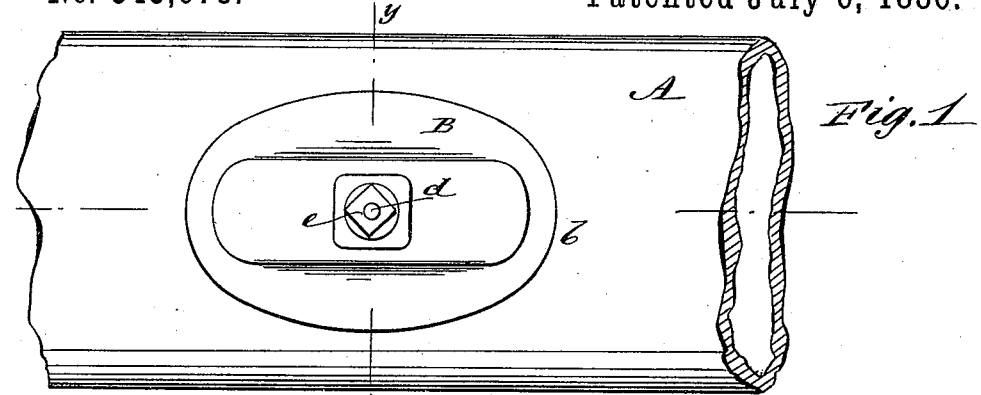
Figure 2:
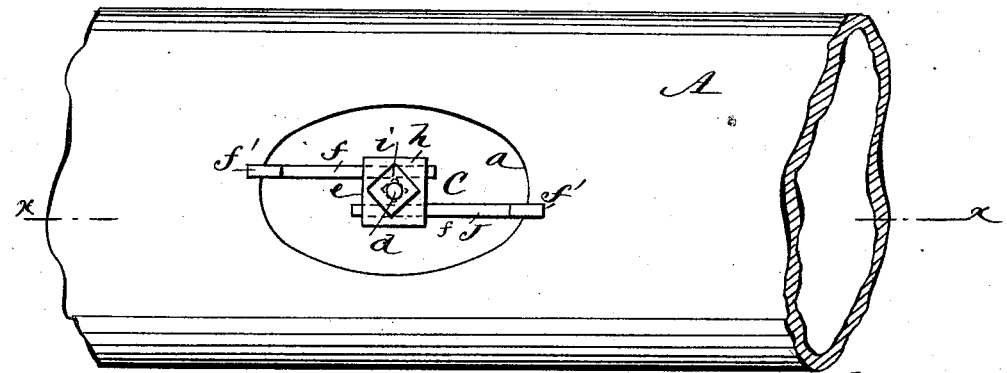
Figures 3, 4:
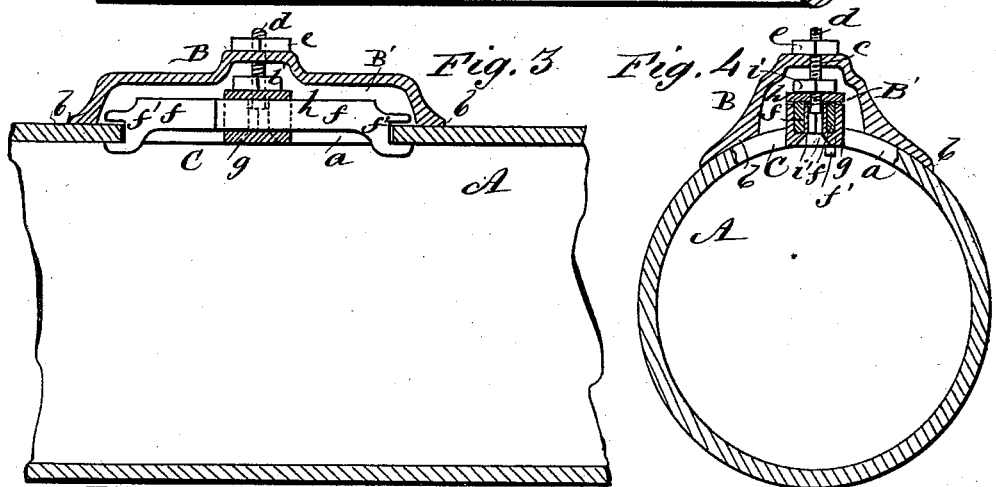

Figure 1 is a plan view showing my invention applied to a pipe. Fig. 2 is a plan view of a pipe, showing the brace or cross piece in place in the opening ready to receive the patch-plate. Fig. 3 is a sectional elevation taken on the line $x$ $x$ of Fig. 2, and Fig. 4 is a transverse sectional elevation taken on the line $y$ $y$ of Fig. 1.

My invention consists, principally, of a patch-plate constructed to fit over an opening in a pipe, combined with a cross-piece adapted to be fitted in the opening and provided with a bolt for securing the patch-plate in place.

The invention also consists of the construction, arrangement, and combination of parts, all as hereinafter described and claimed.

Referring to the drawings, A represents a pipe having an opening, $a$, formed in it. B is the patch-plate, arched in the center and formed with a curved surrounding seat, $b$, shaped to fit upon the pipe A; and in the center of the plate B is formed the orifice $c$, to receive the bolt $d$, held by the brace or cross bar C, placed in the opening $a$, so that by means of the nut $e$ the plate B may be securely seated upon the pipe A, to form a tight joint about the opening, and thus effectually close it. The brace-bar C is formed of two parts or plates, $ff$, each formed with a claw, $f'$, at its outer end, and both adjustably held in a clamp, $g$, so the parts $f$ may be moved longitudinally to connect with the edges of the opening and to fit openings of different lengths. The clamp $g$ is made in box form, open at two of its sides, and through it between the plates $f$ passes the bolt $d$, and on the bolt is placed the washer or plate $h$ and the inner nut, $i$, so that by turning down the nut $i$ the washer or plate $h$ and box $g$ may be drawn together for grasping and holding the plates $ff$. In this manner the single bolt $d$ and nuts $i$ $e$ serve the double purpose of clasping the plates $ff$ and securing the patch-plate B upon the pipe. In some cases, to separate the plates $f$ from the bolt $d$, I shall form the box $g$ with the flanges or webs $i'$ $i'$, (shown clearly in Fig. 4;) but these may be omitted, if desired. The patch-plate B is formed with the cavity B' to inclose the parts of the bar C and clamp and inner nut, which project above or beyond the outer surface of the pipe A, as will be understood from Figs. 3 and 4.

Having thus described my invention, what I claim as new, and desire to secure by Letters Patent, is—

1. A device for closing openings in pipes, consisting of the plate B, bolt $d$, adjustable bars $f$, and a clamp or holding device for the bars $f$, connected to the bolt $d$, substantially as described.

2. The bars $f$, constructed to connect with the pipes in the opening, and the clamp $g$, in which the plates are held, in combination with the bolt $d$, inner and outer nuts, $i$ $e$, and the patch-plate B, formed with a central orifice, substantially as described.

CORNELIUS J. PHILLIPS.

Witnesses:
H. A. WEST,
C. SEDGWICK.